Patented Apr. 26, 1949

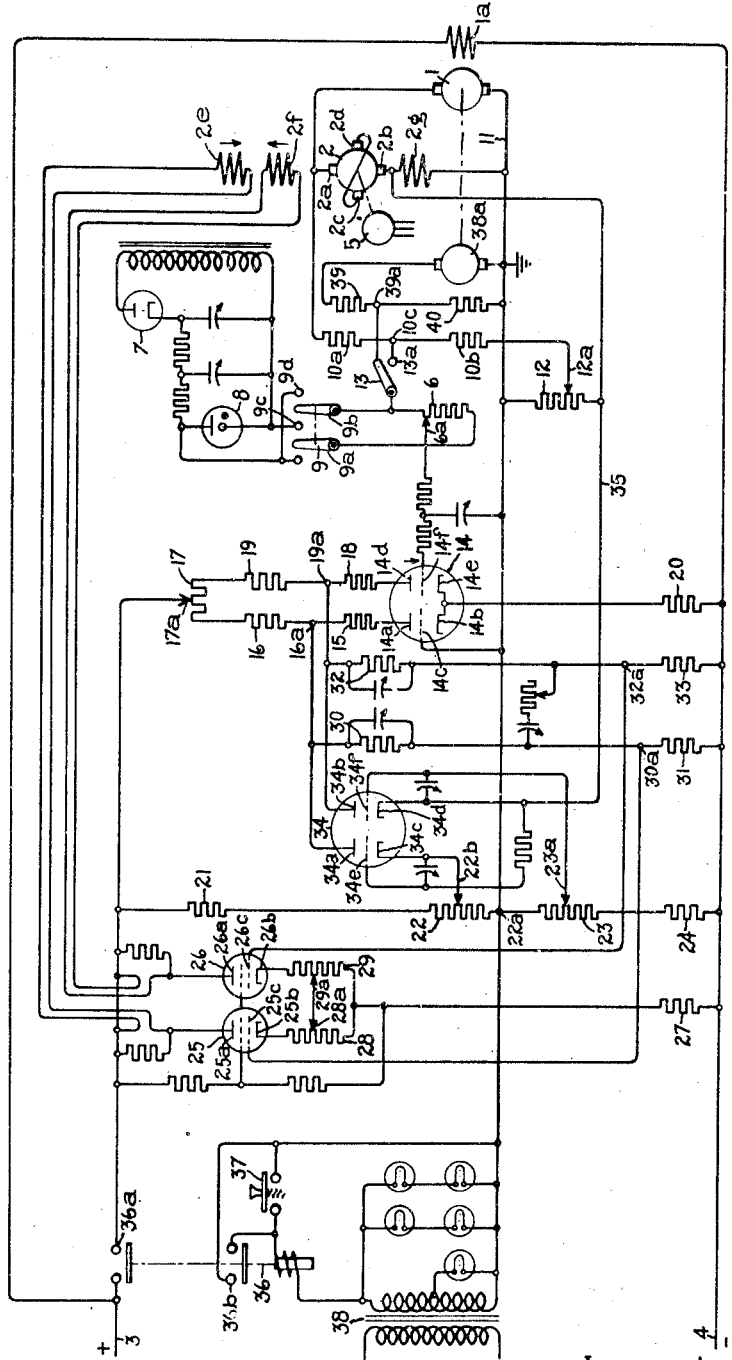

2,468,545

UNITED STATES PATENT OFFICE 2,468,545

CONTROL SYSTEM

William D. Cockrell, Schenectady, N. Y., assignor to General Electric Company, a corporation of New York Application August 27, 1947, Serial No. 770,816

4 Claims. (Cl. 318—142)

This invention relates to control systems, more particularly to systems for controlling the operation of electric motors, and it has for an object the provision of a simple, reliable, inexpensive and improved control system of this character.

More particularly, the invention relates to control systems having provision for limiting the load on the motor to a predetermined value together with means for maintaining the speed of the motor constant at a desired value for loads less than the limiting value.

In carrying the invention into effect in one form thereof, an amplidyne generator is provided for supplying current to a motor. The amplidyne is provided with two opposing field windings. Means are provided for producing a control voltage which is proportional to the speed of the motor. This control voltage is compared with a reference voltage and the difference is amplified by means of a two-stage amplifier of which each stage comprises two cathode coupled balanced electric valve circuits. The conducting path of each second stage valve is connected in circuit with one of the opposing field windings of the amplidyne. For the purpose of limiting the armature current of the motor to a predetermined value, means are provided for producing a control voltage proportional to armature current. An electric valve responsive to a predetermined value of this control voltage takes control of the second stage of the amplifier and causes it to control the net excitation of the amplidyne to limit the current in the armature circuit to a predetermined value.

For a better and more complete understanding of the invention, reference should now be had to the following specification and to the accompanying drawing of which the single figure is a simple, diagrammatical illustration of an embodiment of the invention.

Referring now to the drawing, a direct current electric motor 1 is supplied from an adjustable voltage generator with the armature of which the armature of the motor is connected in a loop circuit. The motor 1 is provided with a field winding 1a which is excited from a suitable source such as the two supply lines 3 and 4.

The generator 2 is preferably an amplidyne. It has a pair of brushes 2a and 2b on the load axis and a pair of short circuited brushes 2c and 2d on a quadrature axis. It is provided with two opposing directional control field windings 2e and 2f and with a series field winding 2g connected in series in the load brush circuit for compensating the armature reaction on the load brush axis. The amplidyne is driven at a speed which is preferably substantially constant by suitable means such as an induction motor 5.

For the purpose of regulating the speed of the motor 1 substantially constant at a desired value, a control voltage which corresponds to the speed of the motor is compared with a reference voltage, and the difference utilized to control the net excitation of the amplidyne. The reference voltage is supplied to the potentiometer 6 from a suitable source such as the rectifier 7 of which the output voltage is maintained at a constant value by means of the diode voltage regulator valve 8. A reversing switch 9 is included in the connections between the rectifier and the potentiometer to control the polarity of the voltage with respect to the terminals of the potentiometer. The control voltage proportional to speed may be derived from the armature terminals of the amplidyne by means of a voltage divider comprising resistors 10a and 10b.

The lower or negative armature terminal of the motor is connected to a conductor 11 which is connected to ground as indicated. One terminal of a potentiometer 12 is connected to the grounded conductor 11 to which the lower terminal of the compensating field winding 2g is also connected, and the other terminal of the potentiometer is connected to the other terminal of the field winding which is negative with respect to the grounded conductor 11 when the brush 2a of the amplidyne is positive. Thus the potentiometer is connected across the field winding. Consequently, the voltage supplied to the potentiometer is proportional to the RI voltage drop in the armature circuit of the motor.

The lower terminal of the voltage divider 10a, 10b is connected to the slider 12a of the potentiometer. If the slider 12a is at the upper end of the potentiometer the voltage supplied to the voltage divider 10 is the terminal voltage of the motor, and with the switch 13 closed in the lower position the control voltage at the intermediate point 10c which is proportional to the motor terminal voltage, is compared, i. e. subtracted from the reference voltage between the upper terminal of the potentiometer 6 and the slider 6a. If the slider 12a is moved downward to a point on potentiometer 12 there is added to the reference voltage a control voltage proportional to the RI drop in the armature circuit of the motor.

The difference of the reference voltage and control voltage proportional to speed is amplified by means of a two-stage amplifier of which each stage comprises two balanced cathode coupled electric valve circuits. The first stage amplifier comprises a twin triode electric valve 14. Its left-hand conducting path includes the anode 14a and cathode 14b with interposed control grid 14c. The right-hand conducting path includes anode 14d and cathode 14e with interposed control grid 14c. The anode 14a is connected through resistors 15 and 16 to one terminal of a balancing potentiometer 17 of which the slider 17a is connected to the positive side 5 of the D.-C. source, and the anode 14d is connected through resistors 18 and 19 to the other terminal of the balancing potentiometer. The cathodes 14b and 14e of both paths are connected together and through a common resistor 20 to the negative conductor 4 of the D.-C. source.

Across the D.-C. source 3 and 4 is connected a voltage divider which is illustrated as comprising resistors 21, 22, 23 and 24 connected in series relationship. The intermediate point 22a, which is preferably the midpoint, is connected to the grounded conductor 11.

The second stage amplifier comprises a pair of electric valves 25 and 26 having anodes 25a and 26a, cathodes 25b and 26b and control grids 25c and 26c, respectively. Cathode coupling of both valves is provided by means of a resistor 27 which is common to the cathode circuits of both valves. The anode-cathode circuit of valve 25 is traced from the positive supply conductor 3 through control field winding 2e, anode 25a, cathode 25b, degenerative resistor 28 and coupling resistor 27 to the negative supply conductor 4. Similarly, the circuit of valve 26 is traced from conductor 3 through opposing control field winding 2f, degenerative resistor 29 and the common coupling resistor 27 to conductor 4.

Between the junction point 16a of anode circuit resistors 15 and 16 and the negative conductor 4 is connected a voltage divider comprising resistors 30 and 31 connected in series. Similarly, between the junction point 19a of anode resistors 18 and 19 and conductor 4 is connected a voltage divider comprising resistors 32 and 33. The control grid 25c is connected to intermediate point 30a of the first divider and control grid 26c is connected to the intermediate point 32a of the other divider.

The initial bias voltages on the grids 14c and 14f when the reference voltage is zero, i. e. when the slider 6a is at the upper end of resistor 6, are such that both paths of valve 14 are conducting equally and approximately in midrange. This equal conduction in both paths produces voltage drops at the points 30a and 32a which bias the valves 25 and 26 for equal conduction approximately in midrange. As a result the opposing field windings 2e and 2f are equally excited; the output voltage of the amplidyne generator 2 is zero and the motor 1 is at standstill.

Suitable electric valve means responsive to a signal voltage proportional to armature current is provided for taking control of the second stage amplifier away from the first stage amplifier and controlling the second stage amplifier to limit the armature current of the motor to a predetermined value. This electric valve means is illustrated as a twin triode electric valve 34. It is preferably of the high-mu type of valve. As shown it has anodes 34a and 34b, cathodes 34c and 34d and control grids 34e and 34f. The anodes 34a and 34b are connected to points 16a and 19a. The voltage across the compensating field winding 2g is utilized as the signal voltage proportional to current. Since the magnitude of this voltage is small, the total drop is used at all times in order to utilize it to maximum effect. Thus the upper terminal of the field winding 2g is connected by means of conductor 35 to the cathode 34d of one conducting path and to the grid 34e of the other path, whereas the cathode 34c and the grid 34f are connected to sliders 22a and 23a respectively which are adjusted to points on resistors 22 and 23 on opposite sides of the midpoint of the bridge which is connected by means of the grounded conductor 11 to the lower terminal of the field winding 2g. Normally both right and left-hand paths are non-conducting As a result of the foregoing connections of the grids and cathodes the sliders 22b and 23a may be adjusted so that the proper path becomes conducting when the voltage drop across the series field winding 2g reaches a value which corresponds to the limiting value of armature current.

An undervoltage relay 36 is provided to protect the output circuit against the failure of the A.-C. supply voltage.

With the foregoing understanding of the elements and their organization, the operation of the system will readily be understood from the following detailed description.

The normally open pushbutton switch 37 is depressed to complete an energizing circuit for the operating coil of the undervoltage relay 36 across the secondary winding of the transformer 38 of which the primary winding is connected to the same A.-C. source as that from which the rectifier 7 is supplied. In response to energization, relay 36 closes its normally open contacts 36a and 36b. Contacts 36b in closing complete a holding circuit in parallel with the contacts of the pushbutton switch 37 which may now be released. Contacts 36a in closing complete the connections from the positive supply line 3 to the electronic control apparatus.

It is assumed that the conduction in both paths of the first and second stage amplifier valves is balanced. As a result, zero voltage is generated by the generator 2 and the motor 1 is at standstill.

Assuming that it is desired to effect rotation of the motor 1 in the forward direction and at a predetermined speed, the slider 6a is moved to a position on the potentiometer 6 which corresponds to the desired operating speed of the motor. The movable contacts 9a and 9b of the directional switch 9 are moved to the right into contact with stationary contacts 9c and 9d respectively. As a result, a voltage is supplied to the terminals of the potentiometer 6 which is positive at the upper terminal and negative at the lower terminal. The switch 13 is moved into contact with the stationary contact 13a.

The voltage at the slider 6a makes the grid 14f negative, thereby decreasing the current flowing in the right-hand conducting path. The decrease in current in the right-hand conducting path decreases the voltage drop across the resistor 20, thereby rendering the voltage of the cathode 14b more negative which results in increasing the current flowing in the left-hand path. The increasing current in the left-hand path is substantially equal to but slightly less than the decreasing current in the right-hand path. The reason that the current in the right-hand path can decrease while the current in the left-hand path increases is that the voltage on the grid 14f becomes more negative with respect to its cathode 14e while the voltage of the cathode 14b becomes more negative with respect to the grid 14c.

As a result of the decreased conduction in the right-hand path, the voltage at the intermediate point 19a becomes more positive. Conversely, the voltage at the intermediate point 16a becomes more negative as a result of the increased conduction in the left-hand path. Similarly, the voltage at the point 32a becomes increasingly positive by an amount proportional to the increase in voltage of the point 19a, and the voltage at the point 30a becomes less positive by an amount proportional to the decrease in voltage of the point 16a.

Since the grid 26c of valve 26 is connected to the point 32a and the grid 25c of valve 25 is connected to the point 20, the current conducted by the valve 26 increases and the current conducted by the valve 25 decreases correspondingly. This results in increasing the excitation of the field winding 2f and decreasing the excitation of the opposing field winding 2e. Thus the balanced excitation of the two field windings is destroyed and the amplidyne generator 2 has a net excitation dependent upon the difference in excitations of the two field windings which causes a voltage to appear at the brushes 2a and 2b which is positive at the brush 2a. This voltage is supplied to the armature of the motor 1 which begins to rotate in the forward direction. As the speed of the motor increases, its counter voltage increases and consequently the voltage applied to the divider 10a and 10b increases. The polarity of this voltage is positive at the upper terminal of the resistor 10a and negative at the lower terminal of the resistor 10b which is connected through the slider 12a and the potentiometer 12 to the negative terminal of the motor armature. Thus a voltage opposite in polarity to the reference voltage is applied between the cathode 14e and the grid 14f of the first stage amplifier. As a result, the voltage of the grid 14f is made slightly more positive with respect to the cathode 14e and this results in a corresponding increase in the current in the right-hand conducting path and a corresponding decrease in the current of the left-hand conducting path. This in turn results in decreasing the current in the field winding 2f and increasing the current in the field winding 2e correspondingly. The field winding 2f still predominates but the net excitation is weaker. Consequently, the motor continues to accelerate but at a slower rate until at a speed which corresponds to the setting of the slider 6a a balanced condition is established and the motor continues to operate at such speed.

As a result of the voltage drop across the series compensating field winding 2g, a voltage is produced across the potentiometer 12 of which the polarity is positive at the upper terminal and negative at the lower terminal. By displacing the slider 12a in a downward direction a portion of this voltage is tapped off and is added in the grid cathode circuit of the right-hand conducting circuit of the first stage valve. Its polarity is such that it adds to the reference voltage between the switch 13 and the slider 6a. This causes the speed of the motor to be increased by a proportional amount. Since the magnitude of this voltage depends upon the magnitude of the armature current of the motor, the increase in speed is therefore proportional to the armature current. By adjustment of the slider 12a, this increase in speed is made to compensate the decrease in speed resulting from the IR voltage drop in the armature circuit which is proportional to the load on the motor.

If the motor should become overloaded and its armature current tend to exceed a predetermined safe value, the voltage at the upper terminal of the field winding 2g becomes increasingly negative. As a result, the voltage at the cathode 34d of the right-hand conducting path and the voltage of the grid 34e of the left-hand conducting path of the limit valve 34 are made correspondingly increasingly negative. At a predetermined value which corresponds to the predetermined safe limiting value of armature current, the right-hand conducting path of valve 34 becomes conducting, thereby decreasing the voltage at the point 19a in the anode circuit of the first stage valve. This has the effect of decreasing the voltage at the point 32a a proportional amount which in turn decreases the current flowing in the right-hand valve 26 of the second stage amplifier. This decreases the excitation of the predominating field winding 2f of the amplidyne generator and thereby correspondingly decreases its net excitation. Thus the current supplied to the motor is prevented from exceeding the predetermined limiting value even though the load on the motor requires a greater current, and the right-hand path of the valve 14 is calling for an increased current. As the voltage of the generator 2 decreases, the current correspondingly decreases. This has the result of slightly increasing the voltage at the cathode 34d and correspondingly slightly increasing the voltage at the point 32a, with the attendant result that the excitation of the field winding 2f is correspondingly slightly increased. A balanced condition is established in which the net excitation of the generator is such that the predetermined limiting value of current is not exceeded.

Rotation of the motor in the opposite direction is effected by moving the directional switch 9 to the left-hand position, thereby to reverse the polarity of the reference voltage of the potentiometer 6. The operation in reverse direction is similar to that in the forward direction but is different in that the variation of currents in the conducting paths of the amplifiers are the reverse of those which take place for the forward direction. Similarly, the polarity of the net excitation of the amplidyne generator 2 is reversed, with the result that the voltage at the load brushes 2a and 2b is reversed and the rotation of the motor 1 takes place in the reversed direction.

A higher degree of accuracy of regulation of the motor speed at the preset value is obtained by providing a tachometer generator 38a driven by the motor 1 to furnish the speed signal voltage, instead of deriving it from the terminal voltage of the motor. A voltage divider comprising resistors 39 and 40 is connected across the armature terminals of the tachometer. The negative terminal of the bridge is connected to the grounded conductor 11. To place the tachometer in operation the switch 13 is moved to the upper closed position. Also, the slider 12a is moved to the upper end of the potentiometer 12 to eliminate the compensation for the RI drop in the armature circuit. Such compensation is not needed when using a tachometer generator because its voltage is a true measure of speed irrespective of the load on the motor.

For the purpose of controlling the gain of the second stage amplifier, the individual degenerative resistors 28 and 29 are provided with sliders 28a and 29a, thereby converting the resistors into potentiometers. The two sliders are connected together. By varying their positions on their potentiometers an adjustable gain is obtained for the stage by simple means using low impedance elements without affecting appreciably the time constants and other adjustments of the over-all circuit.

What I claim as new and desire to secure by Letters Patent of the United States is:

1. A control system for an electric motor comprising means for supplying a variable voltage to said motor comprising a generator provided with a pair of opposing control field windings, a first stage amplifier comprising a source of direct voltage, a pair of switching valves each provided with an anode, a cathode and a control grid, a common connection including a resistor between said cathodes and one side of said source, connections including resistors between said anodes and the other side of said source, a source of reference voltage, means for producing a control voltage corresponding to the speed of the motor, connections for supplying the difference of said control and reference voltages to one of said grids, a second stage amplifier having output circuit connected to said control field windings and having input circuits provided with connections to the anode circuits of said first stage amplifier, a voltage divider connected across said direct voltage source and current limiting means comprising electric valve means provided with two conducting paths, each comprising an anode, a cathode and a control grid, connections from each anode of said conducting paths to a corresponding anode circuit of said first stage amplifier, a connection from the cathode of the first of said paths to a point on said voltage divider and a connection from the grid of the second of said paths to a different point on said voltage divider, means for producing a control voltage proportional to armature current comprising a voltage drop device connected in the armature circuit of said motor, a connection from one terminal of said device to a point on said voltage divider, and a connection from the opposite terminal to the grid of said first path and to the cathode of said second path.

2. A control system for an electric motor comprising means for supplying a variable voltage to said motor comprising a generator provided with a pair of opposing control field windings, a source of direct voltage, a source of reference voltage, means for producing a control voltage corresponding to speed of the motor, means for controlling the excitation of said generator to effect operation of said motor at a speed corresponding to said reference voltage comprising a first electric valve means having a pair of conducting paths each having an anode, a cathode and a control grid, a connection from each anode through a corresponding one of said control field windings to one side of said source, a common cathode resistor connected between said cathodes and the other side of said direct voltage source and connections for supplying to said grids voltages which vary inversely in proportion to the difference of said reference voltage and said control voltage, and current limit means comprising a voltage divider connected across said direct voltage source, electric valve means comprising first and second conducting paths each including an anode, a cathode and a control grid, connections from said last mentioned anodes to one side of said direct voltage source, connections from the cathode of said first conducting path and the grid of said second conducting path to different points on said divider, means for producing a control voltage proportional to the armature current of said motor comprising a voltage drop device connected in series in the armature circuit and having one terminal connected to an intermediate point on said voltage divider and the other terminal connected to the grid of said first conducting path and to the cathode of said second conducting path, and connections from the anodes of said first and second conducting paths to the grids of said first electric valve means.

3. A control system for an electric motor comprising means for supplying a variable voltage to the motor comprising a variable voltage generator provided with a pair of opposing control field windings, a source of direct voltage, a first stage electric valve amplifier having two balanced conducting paths each having an anode, a cathode and a control grid, a common resistor connected between said cathodes and the negative side of said source, separate resistors connected between said anodes and the positive side of said source, a pair of voltage dividers each connected between an intermediate point of a corresponding one of said anode resistors and the negative side of said source, a second stage electric valve amplifier having two balanced conducting paths each connected in circuit with a corresponding one of said field windings and each having a control grid connected to an intermediate point of a corresponding one of said dividers, a source of reference voltage, means for producing a signal voltage corresponding to the speed of the motor, connections for supplying the difference of said reference and speed voltages between the grid and cathode of one conducting path of said first stage amplifier to unbalance the conducting paths of both said stages to effect a net excitation of said generator, a third voltage divider connected across said direct voltage source, and means for limiting the armature current of said motor comprising electric valve means having first and second conducting paths each having an anode, a cathode and a control grid, a connection from each anode of said current limiting valve means to an intermediate point of a corresponding anode resistor of said first stage amplifier, connections from the grid of said first conducting path and from the cathode of said second path to different points on said divider, means for producing a control voltage proportional to motor armature current comprising a voltage drop device connected in the armature circuit and having one terminal connected to an intermediate point on said third divider and having its other terminal connected to the cathode of said first path and the grid of said second path.

4. A control system for an electric motor comprising in combination, means for supplying a variable voltage to the motor comprising a variable voltage generator provided with a pair of opposing control field windings, a source of direct voltage, a first voltage divider connected across said source and having an intermediate point connected to one terminal of said motor and generator and to ground, a first stage electric valve amplifier having first and second balanced conducting paths, each comprising an anode, a cathode and a control grid, a common resistor connected between said cathode and the negative side of said source and an individual resistor connected between each of said anodes and the positive side of said source, a pair of voltage dividers each connected between an intermediate point of a corresponding one of said individual resistors and the negative side of said source, a connection from the grid of said first path to said intermediate point of said first divider, a second stage electric valve amplifier having two balanced conducting paths each connected in circuit with a corresponding one of said field windings and each having a control grid connected to an intermediate point of a corresponding one of said pair of dividers, a source of reference voltage, means for producing a signal voltage corresponding to the speed of the motor, connections for supplying the difference of said reference and signal voltages between the grid and cathode of said second path of said first stage amplifier, and means for limiting the armature current of said motor comprising electric valve means having first and second conducting paths each having an anode, a cathode and a control grid, a connection from each anode of said electric valve means to an intermediate point of a corresponding anode resistor of said first stage amplifier, connections from the grid of the first conducting path and from the cathode of the second conducting path of said electric valve means to points on said first voltage divider on opposite sides of said ground connection, means for producing a control voltage proportional to motor armature current.

WILLIAM D. COCKRELL.

REFERENCES CITED

The following references are of record in the file of this patent:

UNITED STATES PATENTS

| Number | Name | Date |
| --- | --- | --- |
| 2,237,015 | Stratton | Apr. 1, 1941 |
| 2,409,312 | Reeves | Oct. 15, 1946 |
| 2,421,632 | Livingston | June 3, 1947 |